US012785116B2

(12) United States Patent
Commet et al.

(10) Patent No.: US 12,785,116 B2
(45) Date of Patent: Nov. 3, 2026

(54) INTEGRATED PASSIVE-TYPE SEPARATOR ASSEMBLIES FOR SEGREGATING HYDROGEN AND WATER IN FUEL CELL SYSTEMS

(71) Applicant: GM GLOBAL TECHNOLOGY OPERATIONS LLC, Detroit, MI (US)

(72) Inventors: Sean M. Commet, Holly, MI (US); Zeyu Shang, Shelby Township, MI (US); Dean Kostadinovski, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1028 days.

(21) Appl. No.: 17/978,331

(22) Filed: Nov. 1, 2022

(65) Prior Publication Data

US 2024/0145735 A1 May 2, 2024

(51) Int. Cl.
*H01M 8/0258* (2016.01)

(52) U.S. Cl.
CPC ...... *H01M 8/0258* (2013.01); *H01M 2250/20* (2013.01)

(58) Field of Classification Search
CPC . H01M 8/0258–0265; H01M 2250/20; H01M 8/04164–04179
See application file for complete search history.

(56) References Cited

U.S. PATENT DOCUMENTS 3,455,743 A 7/1969 Huebscher et al.
5,478,662 A 12/1995 Strasser
6,602,624 B1 8/2003 Doan et al.
6,835,477 B1 12/2004 Brambilla et al.
(Continued)

FOREIGN PATENT DOCUMENTS

CN 114725453 A 7/2022
DE 102016221566 A1 5/2018
JP 2009123518 A * 6/2009

OTHER PUBLICATIONS

English Machine Translation of Yamagishi et al. JP2009123518A (Year: 2009).*

*Primary Examiner* — Keith Walker
*Assistant Examiner* — Steven S Ha
(74) *Attorney, Agent, or Firm* — Quinn IP Law

(57) ABSTRACT

Presented are passive-type separator assemblies for separating hydrogen and water in fuel cell systems (FCS), methods for making/using such separators, and FCS-powered vehicles equipped with such separators. A liquid-gas separator assembly for an FCS includes an outer housing with an internal compartment, a first port fluidly connecting this internal compartment to an FCS transfer conduit to receive FCS exhaust, and a second port fluidly connecting the internal compartment to an FCS exhaust manifold to transfer water separated from the exhaust. A third port fluidly connects the internal compartment to an FCS hydrogen inlet to transfer hydrogen extracted from the exhaust. A first chamber located inside the internal compartment fluidly connects the first and second ports and evacuates extracted water from the compartment. A second chamber located inside the internal compartment above the first chamber fluidly connects the first chamber to the third port and evacuates extracted hydrogen from the compartment.

20 Claims, 4 Drawing Sheets

(56) References Cited

U.S. PATENT DOCUMENTS

| | | | |
|---|---|---|---|
| 6,841,292 | B2 | 1/2005 | Nelson et al. |
| 6,866,955 | B2 | 3/2005 | Lee et al. |
| 7,160,341 | B2 | 1/2007 | Sinha et al. |
| 7,192,668 | B2 | 3/2007 | Dehne |
| 7,264,895 | B2 | 9/2007 | White |
| 7,759,010 | B2 | 7/2010 | Hoch |
| 7,955,743 | B2 | 6/2011 | Ganapathy et al. |
| 8,137,853 | B2 | 3/2012 | Zhang |
| 8,168,343 | B2 | 5/2012 | Clingerman |
| 8,313,871 | B2 | 11/2012 | Wexel et al. |
| 8,387,441 | B2 | 3/2013 | Falta et al. |
| 8,563,182 | B2 | 10/2013 | Goebel |
| 8,603,654 | B2 | 12/2013 | Cartwright et al. |
| 9,296,311 | B2 | 3/2016 | Kawase et al. |
| 10,207,592 | B1 | 2/2019 | Warden |
| 10,522,855 | B2 | 12/2019 | Tighe |
| 10,873,099 | B1 | 12/2020 | Gurunathan |
| 11,135,931 | B2 | 10/2021 | Martin et al. |
| 11,152,814 | B2 | 10/2021 | Martin et al. |
| 11,211,619 | B2 | 12/2021 | Martuscelli et al. |
| 2003/0155160 | A1 | 8/2003 | Nomura |
| 2004/0058224 | A1 | 3/2004 | Eshraghi et al. |
| 2004/0205032 | A1 | 10/2004 | Routtenberg |
| 2008/0050640 | A1 | 2/2008 | Sun et al. |
| 2011/0039190 | A1 | 2/2011 | Owejan et al. |
| 2011/0207012 | A1 | 8/2011 | Frost et al. |
| 2014/0335432 | A1 | 11/2014 | Sinha et al. |
| 2015/0180079 | A1 | 6/2015 | Leger et al. |
| 2016/0126568 | A1 | 5/2016 | Yamaura |
| 2017/0058420 | A1 | 3/2017 | Goulet et al. |
| 2018/0375123 | A1* | 12/2018 | Okamura ............... B01D 45/08 |
| 2019/0252705 | A1 | 8/2019 | Mathias et al. |
| 2020/0328434 | A1* | 10/2020 | Kurz .................. H01M 8/04119 |

* cited by examiner

INTEGRATED PASSIVE-TYPE SEPARATOR ASSEMBLIES FOR SEGREGATING HYDROGEN AND WATER IN FUEL CELL SYSTEMS

INTRODUCTION

The present disclosure relates generally to electrochemical fuel cell systems (FCS) for converting hydrogen-rich fuels into electricity. More specifically, aspects of this disclosure relate to devices for separating hydrogen gas from liquid water in FC Ss.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

Hybrid-electric and full-electric powertrains take on various architectures, some of which utilize a fuel cell system to generate the requisite electricity for powering the vehicle's electric traction motor(s). A fuel cell is an electrochemical device that is generally composed of an anode electrode that receives hydrogen ($H_2$), a cathode electrode that receives oxygen ($O_2$), and an electrolyte barrier interposed between the anode and cathode electrodes. An electrochemical reaction is induced to oxidize hydrogen molecules at the anode side of the FCS—hydrogen gas is catalytically split in an oxidation half-cell reaction—to generate free electrons (−) and free protons (H+). The free hydrogen protons pass through the electrolyte to the cathode, where these protons react with oxygen and electrons in the cathode to form various stack by-products. Free electrons from the anode, however, cannot pass through the electrolyte; these electrons are redirected to a load, such as a vehicle's traction motors and accessories, before being sent to the cathode.

Fuel cell architectures commonly employed in automotive applications contain a semipermeable polymer electrolyte membrane—also referred to as a "proton exchange membrane" or "PEM"—to provide ion transport between the anode and cathode. Proton exchange membrane fuel cells (PEMFC) generally employ a solid polymer electrolyte (SPE) proton-conducting membrane, such as a perfluorosulfonic acid membrane, to separate product gases and provide electrical insulation of electrodes in addition to facilitating the conduction of protons. The anode and cathode typically include finely dispersed catalytic particles (e.g., platinum) that are supported on carbon particles and mixed with an ionomer. For some fuel cell manufacturing processes, this catalytic mixture may be deposited on the sides of the membrane to form the anode and cathode layers. The combination of the anode catalytic layer, cathode catalytic layer, and electrolyte membrane define a membrane electrode assembly (MEA) in which the anode catalyst and cathode catalyst are supported on opposite faces of the ion conductive solid polymer membrane.

To generate the requisite electricity for powering a motor vehicle, numerous fuel cells are typically combined, in series or in parallel, into a fuel cell stack to achieve a higher output voltage and allow for stronger current draw. For example, a typical fuel cell stack for an automobile may have in excess of two hundred stacked cells. These fuel cell stacks receive reactant gas as a cathode input, typically as a metered flow of ambient air or concentrated gaseous oxygen forced through the stack by a compressor. During normal operation, a quantifiable mass of the oxygen is not consumed by the stack; some of the remnant oxygen is output as cathode waste gas that may include water as a stack by-product. The fuel cell stack also receives hydrogen or hydrogen-rich reactant gas as an anode input that flows into the anode side of the stack. The distribution of hydrogen within the anode flow channels is typically held substantially constant for proper fuel cell stack operation. In some operational modes, supplementary hydrogen is fed into the fuel cell stack so that the anode gas is evenly distributed to achieve a calibrated stack output load. Additionally, a fuel cell stack may be operated in a manner that maintains the MEAs in a humidified state in which gases supplied to the fuel cell stack are humidified to prevent drying of the MEAs. Exhaust generated by the fuel cell stack may therefore include water vapor, liquid water, air, low levels of waste hydrogen gas, and other trace elements.

SUMMARY

Presented herein are passive separator assemblies for segregating hydrogen and water in fuel cell systems (FCS), methods for making and methods for using such separator assemblies, and FCS-powered vehicles equipped with such separator assemblies. In an example, there are presented integrated H2/H2O separator devices that passively extract entrained gaseous hydrogen from liquid water in fuel cell system exhaust. The separator device, which may be mounted to a humidifier housing of a water vapor transfer (WVT) unit and located fluidly upstream from the FC stack's cathode inlet, receives humidified "moist" air from the WVT unit and hydrogen-entrained water from an anode-side water separator. Exploiting principles of turbulent fluid flow, gravity, and disparities in fluid density (e.g., buoyancy), the separator device separates hydrogen gas ($H_2$) from water ($H_2O$) and transmits the extracted $H_2$ to the stack's cathode inlet and the segregated water to an FCS exhaust manifold for expulsion from the system. The separator device may include a rigid manifold housing that contains an internal exhaust chamber partitioned from an internal hydrogen chamber by a chamber wall. A long and thin connector slot extending through an upper end of the chamber wall fluidly connects the two internal fluid chambers. Within the exhaust chamber, the lighter and less-dense hydrogen lifts away from the heavier and more-dense liquid, enters the hydrogen chamber through the connector slot, and is expelled from the manifold housing, e.g., where it is diluted in the cathode air stream. Segregated water slides, under the force of gravity, down a ramped wall extending along the bottom of the exhaust chamber and drains through a manifold exhaust port, e.g., for routing to the FCS exhaust. To incite turbulent flow, the manifold intake port may include a diametric constriction that increases intake fluid velocity and decreases static pressure.

Attendant benefits for at least some of the disclosed concepts include a lightweight and inexpensive device for passively separating hydrogen from water without the use of moving parts or active electronic controls. Other attendant benefits may include the ability to integrate the passive H2/H2O separator device into an existing manifold; doing so eliminates the need for an independent device with concomitant savings in cost, weight, and packaging space. Removing hydrogen from water minimizes the need to dilute FCS exhaust with extra air from the compressor and enables higher efficiency and lower emissions, which leads to increased driving ranges with reduced range anxiety.

Aspects of this disclosure are directed to passive-type separator assemblies for segregating hydrogen and water in fuel cell systems, including both automotive and non-automotive FCS applications. In an example, there is presented a liquid-gas separator assembly for a fuel cell system that contains a transfer conduit (e.g., transferring hydrogen-entrained water from an anode water separator and/or humidified air from a WVT unit), a hydrogen inlet (e.g., feeding gaseous hydrogen back into an FCS cathode air inlet), and an exhaust manifold (e.g., collecting and evacuating exhaust from the FCS). The separator assembly includes a rigid outer housing that mounts, e.g., to a humidifier housing, and contains a fluid-tight internal compartment. An intake (first) fluid port fluidly connects the housing's internal compartment to the transfer conduit to receive therefrom anode exhaust, whereas an exhaust (second) fluid port fluidly connects the internal compartment to the exhaust manifold to transfer thereto water separated from the anode exhaust. A transfer (third) fluid port fluidly connects the housing's internal compartment to the hydrogen inlet to transfer thereto hydrogen separated from the anode exhaust. A pair of fluid chambers is located inside the outer housing's internal compartment: a liquid (first) chamber that fluidly connects the intake (first) port to the exhaust (second) port and evacuates extracted water from the internal compartment; and a gas (second) chamber that is located above the exhaust chamber, fluidly connects the exhaust chamber to the transfer port, and evacuates extracted hydrogen from the internal compartment and, thus, from the separator assembly.

Additional aspects of this disclosure are directed to electric-drive vehicles with electrified powertrains containing traction motors powered by fuel cell systems employing any of the disclosed H2/H2O separator assemblies. As used herein, the terms "vehicle" and "motor vehicle" may be used interchangeably and synonymously to include any relevant vehicle platform, such as passenger vehicles (ICE, REV, FEV, fully and partially autonomous, etc.), commercial vehicles, industrial vehicles, tracked vehicles, off-road and all-terrain vehicles (ATV), motorcycles, farm equipment, watercraft, aircraft, etc. For non-automotive applications, disclosed concepts may be implemented for all logically relevant uses, including stand-alone power stations, portable power packs, backup generator systems, pumping equipment, residential, commercial and industrial uses, electric vehicle charging stations (EVCS), etc.

In an example, an electric-drive vehicle includes a vehicle body with a passenger compartment, multiple road wheels mounted to the vehicle body (e.g., via corner modules coupled to a unibody or body-on-frame chassis), and other standard original equipment. An electrified powertrain contains one or more vehicle-mounted traction motors that operate alone (e.g., for FEV powertrains) or in conjunction with an internal combustion engine assembly (e.g., for HEV powertrains) to selectively drive one or more of the road wheels and thereby propel the vehicle. A resident FCS, which is mounted to the vehicle, oxidizes a hydrogen-based fuel to thereby generate an FCS voltage to power the electrified powertrain. The FCS includes a stack of fuel cells, a transfer conduit that receives anode exhaust from the fuel cell stack, a cathode air inlet that feeds hydrogen into the fuel cell stack, and an exhaust manifold that evacuates anode exhaust from the FCS.

Continuing with the discussion of the preceding example, the vehicle is also equipped with a liquid-gas separator assembly that passively separates gaseous hydrogen from liquid water in anode exhaust. The separator assembly includes a rigid outer housing that mounts to the FCS and contains a fluid-tight internal compartment. An intake port fluidly connects the housing's internal compartment to the transfer conduit to receive therefrom FCS exhaust, whereas an exhaust port fluidly connects the internal compartment to the exhaust manifold to transfer thereto extracted water separated from the FCS exhaust. Additionally, a transfer port fluidly connects the internal compartment to the cathode air inlet to transfer thereto extracted hydrogen separated from the FCS exhaust. Located inside the housing's internal compartment is an exhaust chamber that fluidly connects the intake and exhaust ports and evacuates extracted water from the internal compartment to the exhaust manifold. Located inside the internal compartment above the exhaust chamber is a hydrogen chamber that fluidly connects the exhaust chamber to the transfer fluid port and evacuates extracted hydrogen from the internal compartment to the cathode air inlet.

Aspects of this disclosure are also directed to manufacturing workflow processes, system control logic, and computer-readable media (CRM) for making and/or using any of the disclosed separator assemblies. In an example, a method is presented for manufacturing a liquid-gas separator assembly for a fuel cell system. This representative method includes, in any order and in any combination with any of the above and below disclosed options and features: receiving an outer housing defining therein a fluid-tight internal compartment; fluidly connecting the internal compartment to a transfer conduit of the FCS via a first fluid port configured to receive from the transfer conduit FCS exhaust containing hydrogen and water; fluidly connecting the internal compartment to an exhaust manifold of the FCS via a second fluid port configured to transfer to the exhaust manifold extracted water separated from the FCS exhaust; and fluidly connecting the internal compartment to a hydrogen inlet of the FCS via a third fluid port configured to transfer to the hydrogen inlet extracted hydrogen separated from the FCS exhaust, wherein a first fluid chamber located inside the internal compartment of the outer housing fluidly connects the first fluid port to the second fluid port and is configured to evacuate the extracted water from the internal compartment through the second fluid port, and wherein a second fluid chamber located inside the internal compartment above the first fluid chamber fluidly connects the first fluid chamber to the third fluid port and is configured to evacuate the extracted hydrogen from the internal compartment through the third fluid port.

For any of the disclosed separator assemblies, methods, and vehicles, a chamber wall may be located inside the housing's internal compartment to separate the two fluid chambers. In this instance, the chamber wall has a connector port that fluidly connects the two fluid chambers. Optionally, the length of the chamber wall, which extends from the intake port to the exhaust port, may be substantially coterminous with the length of the exhaust chamber; the connector port may be an elongated slot with a slot length that extends about 65% or less of the wall's length, e.g., to prevent extracted water from reaching the transfer port and being recirculated back into the fuel cell stack. As yet a further option, the intake port may incorporate a fluid constriction that is interposed between the housing's internal compartment and the transfer conduit. Through Bernoulli's principle, the fluid constriction induces turbulent flow of the FCS exhaust that is entering the exhaust chamber through the intake port from the transfer conduit.

For any of the disclosed separator assemblies, methods, and vehicles, the exhaust chamber may include opposing top and bottom walls that extend between the intake and exhaust ports. In this instance, the bottom wall extends in a downward slope, e.g., at an angle of about 5-15 degrees from a central horizontal plane, from the intake port to the exhaust fluid port such that extracted water flows, under the force of gravity, out of the separator assembly through the exhaust port. As another option, a height of the exhaust chamber, from bottom wall to top wall thereof, may vary (e.g., increases then decreases) when moving along the length of the internal compartment from the intake to the exhaust port. In a similar regard, a width of the exhaust chamber, between opposing sidewalls thereof, may vary (e.g., decreases then increases) when moving along the length of the internal compartment from the intake to the exhaust port. Optionally, a total volume of the exhaust chamber may be markedly less than a total volume of the hydrogen chamber, e.g., to facilitate separation and transfer of hydrogen gas.

For any of the disclosed separator assemblies, methods, and vehicles, the intake port fluidly connects to the internal compartment along a medial (first) horizontal plane, whereas the exhaust port fluidly connects to the internal compartment along a lower (second) horizontal plane below the medial plane, e.g., such that extracted water flows, under the force of gravity, out through the exhaust port. By comparison, the transfer port fluidly connects to the internal compartment along an upper (third) horizontal plane above the medial plane, e.g., such that extracted hydrogen floats up and out through the exhaust port. For some configurations, the intake port has a small (first) diameter, the exhaust port has a medium (second) diameter that is equal to or greater than the intake port's diameter, and the transfer port has a large (third) diameter that is greater than the other two ports' diameters. As another option, the separator assembly's outer housing and three fluid ports may be integrally formed (e.g., from cast or precision-machined metal or injection molded or 3D-printed polymer) as a single-piece structure. In this instance, the exhaust and hydrogen chambers are adjoining segments of the housing's internal compartment, e.g., physically separated and fluidly connected by the internal chamber wall.

The above Summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
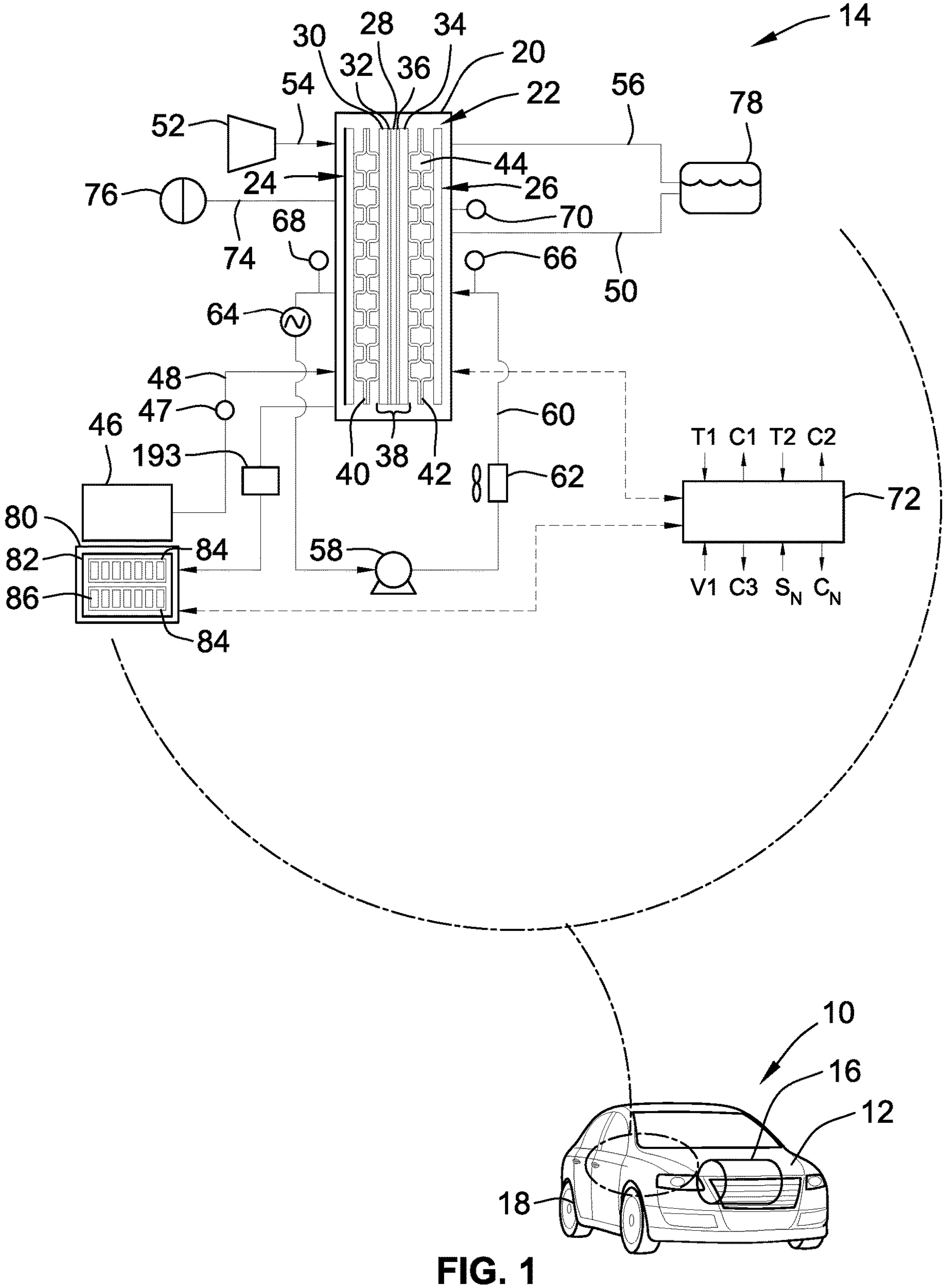
FIG. 1 is an elevated, perspective-view illustration of a representative motor vehicle with an inset schematic illustration of a rechargeable energy storage system (RES S) containing a traction battery pack and a fuel cell system for operating the electric motor(s) of an electrified powertrain according to aspects of the disclosed concepts.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Discussed below are integrated passive-type separator devices for segregating gaseous hydrogen and liquid water in fuel cell systems. In an example, an H2/H2O separator assembly separates entrained hydrogen from liquid water in FCS exhaust without using mechanical parts, fluid pumps, or electronic control. Doing so allows the separator assembly to be integrated into existing hardware of a fuel cell system without the added cost, mass, packaging space, or complexity of active separator devices. The separator assembly uses principles of turbulent fluid flow, gravity, and buoyancy to separate hydrogen gas from streaming water, recirculate the extracted hydrogen back into the fuel cell stack, and concomitantly drain the extracted water from the FCS. Rather than using a dedicated pump, the separator assembly may use an existing cathode air stream to draw the hydrogen away from the water and out of the separator assembly to reintroduce the extracted hydrogen back into the fuel cell stack. To facilitate separation, the separator assembly's intake port may incorporate a diametric constriction that increases intake fluid velocity and decreases static pressure to incite turbulent flow. Segregated water slides, under the force of gravity, down a ramped wall of the separator's internal exhaust chamber and drains out of the assembly through a liquid exhaust port.

Referring now to the drawings, wherein like reference numbers refer to like features throughout the several views, there is shown in FIG. 1 a representative automobile, which is designated generally at 10 and portrayed herein for purposes of discussion as a sedan-style, fuel cell electric vehicle (FCEV). The illustrated automobile 10—also referred to herein as "motor vehicle" or "vehicle" for short—is merely an exemplary application with which novel aspects of this disclosure may be practiced. In the same vein, incorporation of the present concepts into a full-electric powertrain should be appreciated as a non-limiting implementation of disclosed features. As such, it will be understood that aspects and features of this disclosure may be applied to other powertrain architectures, utilized for a variety of different fuel cell system configurations, incorporated into any logically relevant type of vehicle, and implemented for automotive and non-automotive applications alike. Moreover, only select components of the motor vehicles, fuel cell systems, and H2/H2O separator assemblies are shown and described in additional detail herein. Nevertheless, the vehicles, systems and assemblies discussed below may include numerous additional and alternative features, and other available peripheral components, for carrying out the various methods and functions of this disclosure.

Packaged within the vehicle body 12 of automobile 10 is a representative fuel cell system 14 for powering a prime mover, such as electric motor generator unit (MGU) 16, that is operable for driving any one or more of the vehicle's road wheels 18. Proton exchange membrane fuel cell system 14 of FIG. 1 is equipped with one or more fuel cell stacks 20, each of which is composed of multiple fuel cells 22 of the PEM type that are stacked and connected in electrical series or parallel with one another. In the illustrated architecture, each fuel cell 22 is a multi-layer construction with an anode side 24 and a cathode side 26 that are separated by a proton-conductive perfluorosulfonic acid membrane 28. An anode diffusion media layer 30 is provided on the anode side 24 of the PEMFC 22, with an anode catalyst layer 32 interposed between and operatively connecting the membrane 28 and corresponding diffusion media layer 30. Juxtaposed in opposing spaced relation to the anode layers 30 and 32 is a cathode diffusion media layer 34, which is provided on the cathode side 26 of the PEMFC 22. A cathode catalyst layer 36 is interposed between and operatively connects the membrane 28 and corresponding diffusion media layer 34. The two catalyst layers 32 and 36 cooperate with the membrane 28 to define, in whole or in part, a membrane electrode assembly (MEA) 38.

The diffusion media layers 30 and 34 are porous constructions that provide for fluid inlet transport to and fluid exhaust transport from the MEA 38. An anode flow field plate (or "first plate") 40 is provided on the anode side 24 in abutting relation to the anode diffusion media layer 30. In the same vein, a cathode flow field plate (or "second plate") 42 is provided on the cathode side 26 in abutting relation to the cathode diffusion media layer 34. Coolant flow channels 44 traverse each of the plates 40 and 42 to allow cooling fluid to flow through the fuel cell 22. Fluid inlet ports and headers direct a hydrogen-rich fuel and an oxidizing agent to respective passages in the anode and cathode flow field plates 40, 42. A central active region of the anode's plate 40 that faces the proton-conductive membrane 28 may be fabricated with an anode flow field composed of serpentine flow channels for distributing hydrogen over an opposing face of the membrane 28. The MEA 38 and plates 40, 42 may be stacked together between stainless steel clamping plates and monopolar end plates (not shown). These clamping plates may be electrically insulated from the end plates by a gasket or dielectric coating. The fuel cell system 14 may also employ anode recirculation where an anode recirculation gas is fed from an exhaust manifold or headers through an anode recirculation line for recycling hydrogen back to the anode side 24 input so as to conserve hydrogen gas in the stack 20.

Hydrogen ($H_2$) inlet flow—be it gaseous, concentrated, entrained, or otherwise—is transmitted from a hydrogen source, such as fuel storage tank 46, to the anode side 24 of the fuel cell stack 20 via a fluid injector 47 coupled to a (first) fluid intake conduit or hose 48. Anode exhaust exits the stack 20 via a (first) fluid exhaust conduit or hose 50. Although shown on the inlet side of the stack, a compressor or pump 52 provides a cathode inlet flow, such as ambient air and/or concentrated gaseous oxygen ($O_2$), via a (second) fluid intake line or manifold 54 to the cathode side 26 of the stack 20. Cathode exhaust is output from the stack 20 via a (second) fluid exhaust conduit or manifold 56. Flow control valves, flow restrictions, filters, and other available devices for regulating fluid flow can be implemented by the PEMFC system 14 of FIG. 1. Electricity generated by the fuel cell stack(s) 20 and output by the fuel cell system 14 may be transmitted for storage to an in-vehicle traction battery pack 82 within a rechargeable energy storage system (RESS) 80.

Fuel cell system 14 of FIG. 1 may also include a thermal sub-system operable for controlling the temperature of the fuel cell stack 20 during preconditioning, break-in, and post-conditioning. According to the illustrated example, a cooling fluid pump 58 pumps a cooling fluid through a coolant loop 60 to the fuel cell stack 20 and into the coolant channels 44 in each cell 22. A radiator 62 and an optional heater 64 fluidly coupled in the coolant loop 60 are used to maintain the stack 20 at a desired operating temperature. This fuel cell conditioning system may be equipped with various sensing devices for monitoring system operation and progress of fuel cell break-in. For instance, a (first) temperature sensor 66 monitors a temperature value of the coolant at a coolant inlet to the fuel cell stack 20, and a (second) temperature sensor 68 measures a temperature value of the coolant at a coolant outlet of the stack 20. An electrical connector or cable 74 connects the fuel cell stack 20 to an electric power load 76, which may be employed to draw a current from each cell 22 in the stack 20. A voltage/current sensor 70 is operable to measure, monitor, or otherwise detect fuel cell voltage and/or current across the fuel cells 22 in the stack 20.

Programmable electronic control unit (ECU) 72 helps to control operation of the fuel cell system 14. As an example, ECU 72 receives temperature signals T1 from temperature sensors 66, 68 that indicate the temperature of the fuel cell stack 20; ECU 72 may be programmed to responsively issue command signals C1 to modulate operation of the stack 20. ECU 72 of FIG. 1 also receives voltage signals V1 from a voltage sensor/current 70; ECU 72 may be programmed to responsively issue command signals C2 to modulate operation of a hydrogen source (e.g., fuel storage tank 46) and/or compressor/pump 52 to thereby regulate the electrical output of the stack 20. ECU 72 of FIG. 1 is also shown receiving coolant temperature signals T2 from sensor 66 and/or 68; ECU 72 may be programmed to responsively issue command signals C3 to modulate operation of the fuel cell's thermal system. Additional sensor signals SN may be received by, and additional control commands CN may be issued from the ECU 72, e.g., to control any other subsystem or component illustrated and/or described herein. The ECU 72 may emit a command signal to transmit evolved hydrogen and liquid $H_2O$ from the cathode side 26 through fluid exhaust conduit 56 to a water separator 78 (FIG. 1) where hydrogen and water from the cathode are combined with depleted hydrogen exhausted from the anode through fluid exhaust conduit/hose 50.

With continuing reference to FIG. 1, the traction battery pack 82 contains an array or rechargeable lithium-class (secondary) battery modules 84. Aspects of the disclosed concepts may be similarly applicable to other electric storage unit architectures, including those employing nickel metal hydride (NiMH) batteries, lead acid batteries, lithium metal batteries, or other applicable type of rechargeable electric vehicle battery (EVB). Each battery module 84 may include a series of electrochemical battery cells, such as pouch-type lithium ion (Li-ion) or Li-ion polymer battery cells 86. An individual battery module 84, for example, may be typified by a grouping of 10-45 Li-ion battery cells that are stacked in side-by-side facing relation with one another and connected in parallel or series for storing and supplying electrical energy. While described as silicon-based, Li-ion "pouch cell" batteries, the cells 86 may be adapted to other constructions, including cylindrical and prismatic constructions. To boost the voltage output of the vehicle FCS, a respective DC-to-DC boost converter (DC CON) 193 may be electrically interposed between the fuel cell stack 20 and the RESS.

Figure 2:
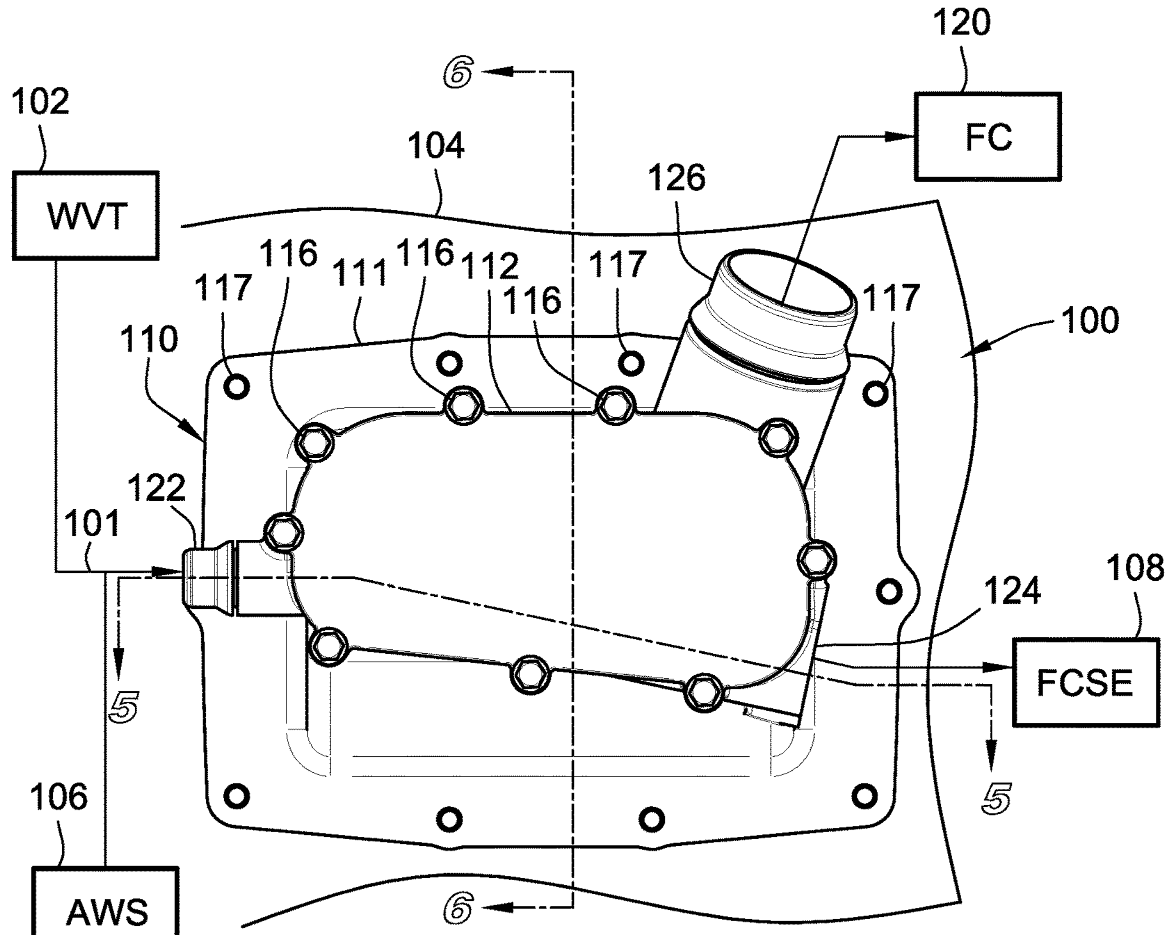
FIG. 2 is a front-view illustration of a representative passive H2/H2O separator assembly for a fuel cell system (FCS) in accordance with aspects of the present disclosure.

Turning next to FIG. 2, there is shown an example of a system-integrated, passive-type separator assembly 100 for segregating hydrogen and water in a fuel cell system, such as proton exchange membrane FCS 14 of FIG. 1. In the illustrated architecture, the separator assembly 100 is fixedly mounted onto a load-bearing wall of a humidifier housing 104 of a water vapor transfer (WVT) unit 102 and plumbed to receive humidified "moist" air (e.g., relative humidity (RH)<100%) from the WVT unit 102 and hydrogen-entrained liquid water (e.g., RH>>100%) from an anode-side water separator (AWS) unit 106. WVT unit 102 may fluidly connect a cathode output line (e.g., cathode exhaust manifold 56) of the FCS with a cathode input line (e.g., cathode intake manifold 54) to humidify the incoming cathode airflow using wet air from the cathode's exhaust. In a similar regard, the AWS unit 106 may fluidly connect an anode output line (e.g., anode exhaust hose 50) of the FCS with an anode input line (e.g., anode intake hose 48) to separate and drain water from the anode's exhaust while concurrently recirculating unspent reactants (e.g., hydrogen and nitrogen) back into the anode side of a fuel cell stack 120.

Once separated, extracted hydrogen and, in some instances, a restricted volume of moist air may be passively transferred from the separator assembly 100 back into the cathode side of the stack 120 and directed into the cathode diffusion media and flow channels of the individual fuel cells (FC). At the same time, the separator assembly 100 passively collects and drains segregated water to a fuel cell system exhaust (FCSE) 108, which may be equipped with a bleed line and a dump valve (not shown) that selectively exhaust water and nitrogen from the FCS or recycle metered amounts of the waste water as desired. It should be appreciated that the separator assembly 100 may be packaged at other locations within or external to the FCS and may be fluidly interconnected to greater, fewer, or alternative FCS components than what are shown.

Figure 4:
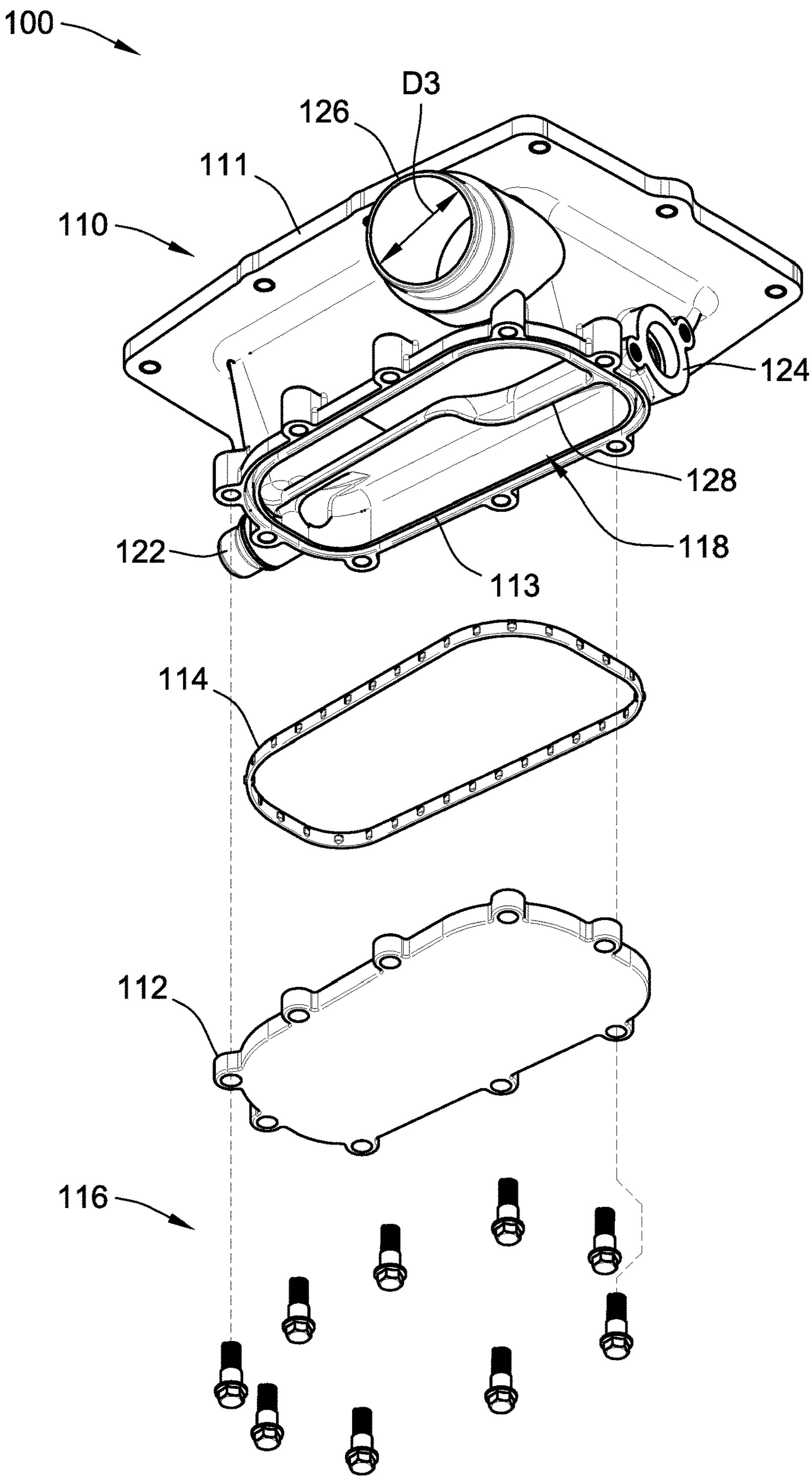
FIG. 4 is a partially exploded, perspective-view illustration of the representative separator assembly of FIG. 2.
Figure 5:
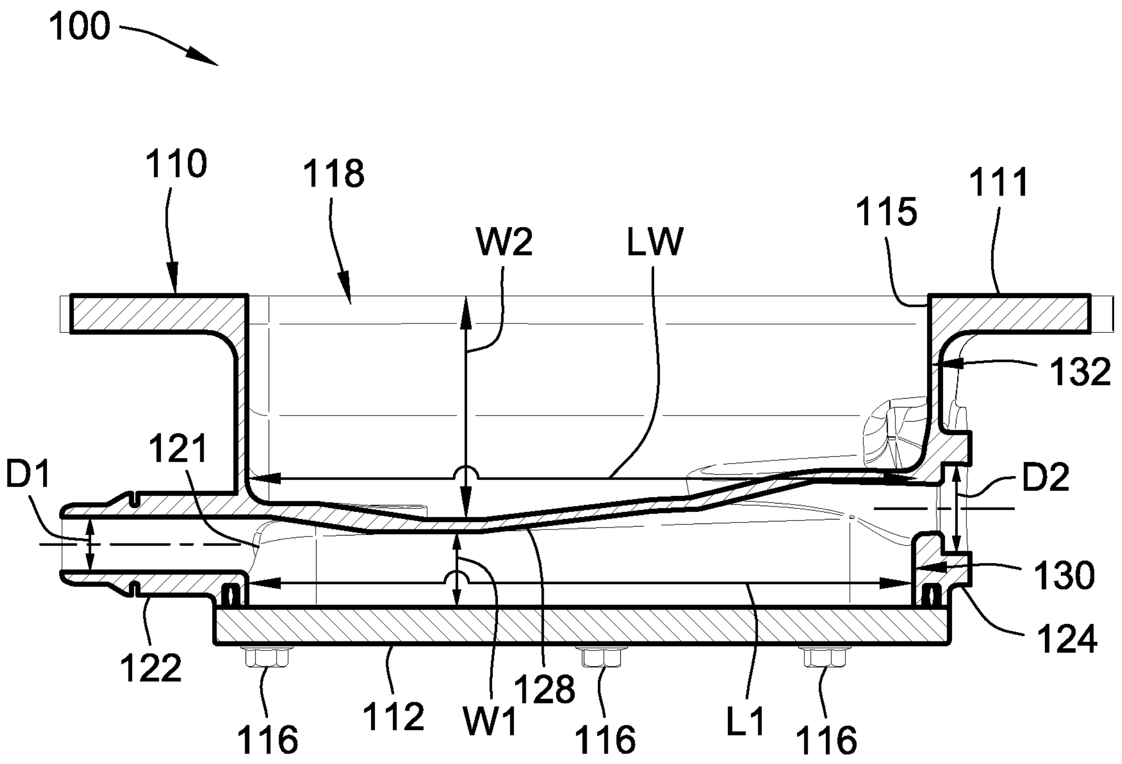
FIG. 5 is a cutaway, plan-view illustration of the representative separator assembly of FIG. 2 taken in cross-section along line 5-5.

Separator assembly 100 of FIG. 2 is a passive-type fluid control device in that it may be typified by no moving parts, no electronic components, no active heat exchangers, and no controller-automated operation. As shown, the H2/H2O separator assembly 100 is fabricated with a rigid outer housing 110 (also referred to herein as "manifold housing") that is formed with an integral mounting flange 111, which projects outwardly from an interior (first) face of the housing 110, and an integral gasket seat 113, which projects outwardly from an exterior (second) face of the housing 110 opposite that of the interior face. Extending through an inboard face of the manifold housing 110 is an interior opening 115 (FIGS. 4 and 5) that is circumscribed by the mounting flange 111 and may be generally rectangular in shape. Likewise, an exterior opening 119 (FIG. 3) extends through an outboard face of the manifold housing 110 and may be circumscribed by the gasket seat 113. Through these "open" faces of the housing 110, it can be seen that the separator assembly 100 does not contain any moving parts, electronic devices, electrical connectors, heat exchangers, coolant channels, etc.

To shut and seal the separator assembly 100, the interior opening 115 is closed off by the WVT's humidifier housing 104 upon mounting of the manifold housing 104 to the WVT unit 102, e.g., via bolts 116 received through bolt holes 117 in the flange 111. A complementary gasket or silicone adhesive may be applied to seal the inboard face of the separator assembly 100 to the humidifier housing 104. The exterior closing 119 is closed off by an optional face plate 112 that is mounted over the gasket seat 113, e.g., via a set of bolts 116. An optional polymeric ring gasket 114 fits into a complementary channel in the gasket seat 113 and compresses between the face plate 112 and the housing 110 to thereby seal closed the outboard face. When the interior and exterior faces of the manifold housing 110 are closed off, the separator assembly 110 creates a fluid-tight internal compartment 118 (FIG. 5) within which is collected and processed FCS exhaust. It is envisioned that the separator assembly's housing 110 may be formed as a closed structure (i.e., without one or both of the openings 115, 119) and, thus, may eliminate the gasket seat 113, ring gasket 114, and bolts 116. Moreover, the manifold housing 110 may be secured in place using other mounting hardware (e.g., screws, rivets, studs, etc.) and, thus, may modify or eliminate the mounting flange 111.

In order to collect anode and cathode exhaust from the FCS, an intake (first) port 122 fluidly connects the internal compartment 118 within the separator assembly's outer housing 110 to an FCS exhaust transfer conduit 101; in so doing, the intake port 122 receives hydrogen-and-water filled FCS exhaust from the transfer conduit 101. Although shown as receiving humidified air from the WVT unit 102 via the exhaust transfer conduit 101 and intake port 122, the separator assembly 100 may function as an "endcone" of the WVT unit 102 with the exhaust chamber 130 fluidly connected to the WVT's fluid stream via a dedicated slot. To evacuate collected water from the outer housing 110, an exhaust (second) port 124 fluidly connects the internal compartment 118 to an exhaust manifold in the FCS exhaust 108 and transfers thereto water extracted from FCS exhaust by the separator assembly 100. In order to recycle gaseous hydrogen back into the FCS, a transfer (third) port 126 fluidly connects the internal compartment 118 to a hydrogen inlet of the fuel cell stack 120 and transmits thereto hydrogen extracted from the FCS exhaust by the separator assembly 100. While it is envisioned that the fluid porting may be individually manufactured and subsequently coupled to the separator housing, it may be desirable that the outer housing 110 and three fluid ports 122, 124, 126 be integrally formed (e.g., from cast or precision-machined metal or injection molded or 3D-printed polymer) as a one-piece, unitary structure.

Fluid porting of the separator assembly housing 110 may be designed to optimize exhaust intake, H2/H2O segregation, water drainage, and hydrogen recirculation. In accord with the example illustrated in FIG. 3, the intake port 122 may fluidly connect to the internal compartment 118 of the manifold housing 110 along a medial (first) horizontal plane HP1, whereas the exhaust port 124 may fluidly connect to the internal compartment 118 along a lower (second) horizontal plane HP2 that is located below the medial horizontal plane HP1 such that extracted water flows, under the force of gravity, from the intake port 122 and out of the separator assembly 100 through the exhaust port 124. Vertically offsetting the intake and exhaust ports 122, 124 may also help to generate eddy currents in the incoming exhaust flow that, in turn, incites hydrogen separation. Moreover, the transfer port 126 may fluidly connect to the internal compartment 118 along an upper (third) horizontal plane HP3 that is located above the medial and lower planes HP1 and HP2 such that less-dense gaseous hydrogen floats out of the separator assembly 100 through the transfer port 126 while helping to minimize the inadvertent recirculation of water back into the FC 120. To further facilitate H2/H2O separation and water drainage, an internal (first) diameter D1 (FIG. 5) of the intake port 122 may be less than or equal to an internal (second) diameter of the exhaust port 124 (e.g., D1=16 mm; D2=16-20 mm). To further facilitate hydrogen transmission, an internal (third) diameter of the transfer port is greater than that of the intake and exhaust ports (e.g., D3=50 mm).

Figure 6:
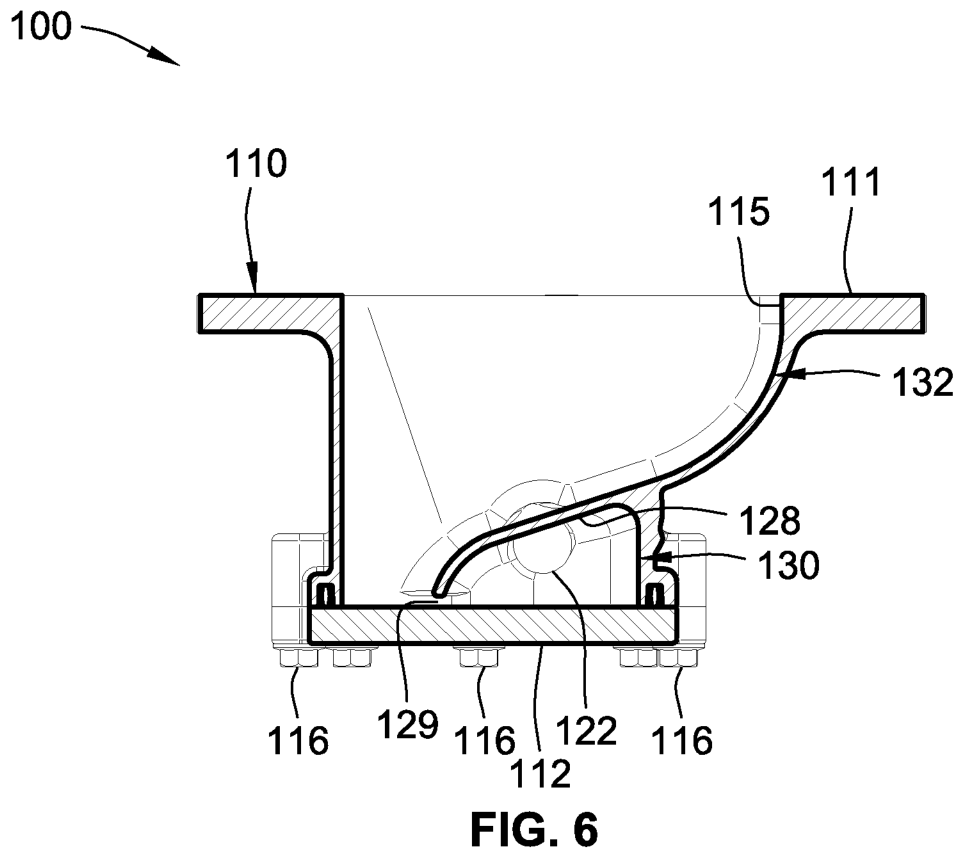
FIG. 6 is a cutaway, end-view illustration of the representative separator assembly of FIG. 2 taken along line 6-6.

Collection, separation, and transfer of hydrogen and water is performed within two collaborating fluid chambers located inside the internal compartment 118 of the outer housing 110: an exhaust chamber (or "first fluid chamber") 130 that extends lengthwise along a lower extent of the compartment 110, and a hydrogen chamber (or "second fluid chamber") 132 extending lengthwise along an upper extent of the compartment 110. As shown, the two neighboring fluid chambers 130, 132 are adjoining segments of the internal compartment 118 that are physically separated by an internal chamber wall 128. The exhaust chamber 130 fluidly connects the intake port 122 to the exhaust port 124 and passively evacuates therethrough extracted water from the internal compartment 118. At least a portion of the hydrogen chamber 132 is located on top of the exhaust chamber 130 and fluidly connects the exhaust chamber 130 to the transfer port 126; with this arrangement, the chamber 132 passively evacuates therethrough extracted hydrogen from the internal compartment 118. The sectional view of FIG. 6 shows that an outboard portion of the hydrogen chamber 132 (i.e., the portion closest to the face plate 112) is located above and extends substantially the entire length of the exhaust chamber 130. An inboard portion of the hydrogen chamber 132 (i.e., the portion closest to the WVT unit 102) extends above and below the exhaust chamber 130.

Figure 3:
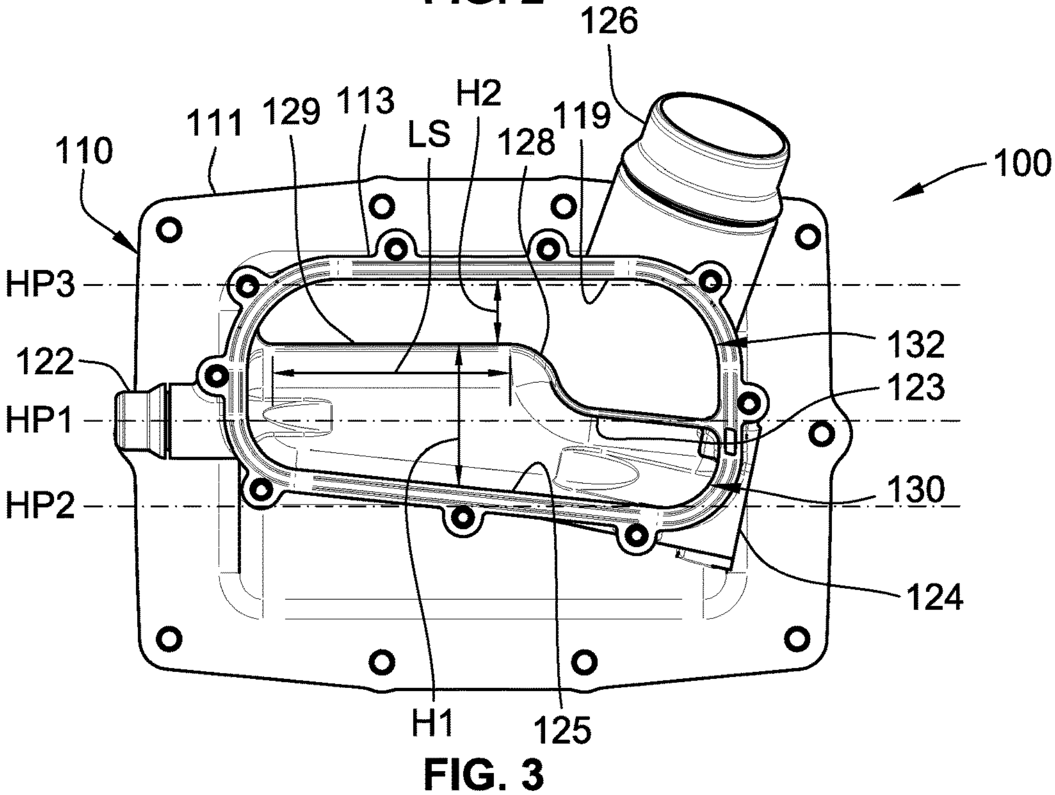
FIG. 3 is another front-view illustration of the representative separator assembly of FIG. 2 with the front face plate and the FCS humidifier housing removed to more clearly show the internal fluid chambers of the separator assembly.

It may be desirable that a vertical (first) height H1 of the exhaust chamber 130 varies when traversing along the length of the internal compartment 118 between the intake and exhaust ports 122, 124 (e.g., progressively increases then decreases when moving left to right in FIG. 3). In this instance, a vertical (second) height H2 of the portion of the hydrogen chamber 132 located above the exhaust chamber 130 may also vary when traversing along the length of the internal compartment 118 (e.g., progressively increases when moving left to right in FIG. 3). Moreover, an inboard-to-outboard (first) width W1 of the exhaust chamber 130 may vary when traversing along the length of the internal compartment 118 between the intake and exhaust ports 122, 124 (e.g., progressively decreases then increases when moving left to right in FIG. 5). In the same vein, an inboard-to-outboard (second) width W2 of the hydrogen chamber 130 may vary (e.g., increase then decrease) when traversing along the length of the internal compartment 118 between the intake and exhaust ports 122, 124. In another option, a total (second) internal fluid volume of the hydrogen chamber 132 may be significantly greater than a total (first) internal fluid volume of the exhaust chamber 130 (e.g., approximately 2× to 3× larger).

Located inside the separator assembly's internal compartment 118 is a chamber wall 128 that partitions the two chambers 130, 132 and, at the same time, governs the flow of fluid between these chambers 130, 132. In accord with the illustrated example, the internal chamber wall 128 may have a curvilinear plan-view geometry (e.g., longitudinal section of FIG. 5) and an arcuate, S-shaped end-view sectional geometry (e.g., vertical section of FIG. 6). Extending through an uppermost segment of the chamber wall 128 is a connector port 129 that fluidly connects the exhaust and hydrogen chambers 130, 132. It may be desirable that a side-to-side length LW of the chamber wall 128 (FIG. 5), which extends from the intake port 122 to the exhaust port 124, be substantially coterminous with a side-to-side (first) chamber length L1 of the exhaust chamber 130. Conversely, the connector port 129 may be an elongated slot with a slot length LS that extends about 65% or less of the wall length LW. As shown, the connector port 129 slot may be about 3 mm wide and about 100 mm long. While portrayed as an integral segment of the manifold housing's internal compartment 118, the exhaust chamber 130 and/or hydrogen chamber 132 may each be a self-contained vessel that is housed inside the compartment 118.

To facilitate separation of gaseous hydrogen from the incoming flow of FCS exhaust, the intake port 122 may incorporate a fluid constriction 121 (FIG. 5) that is interposed between the housing's internal compartment 118 and the exhaust-transmitting transfer conduit 101. The fluid constriction 121 is a rapid diametric reduction that increases intake fluid speed while reducing static pressure; doing so causes turbulent flow of the FCS exhaust entering the exhaust chamber 130 through the intake port 122 from the transfer conduit 101. To facilitate drainage of liquid water from the separator assembly 100, the exhaust chamber 130 includes opposing top and bottom walls 123 and 125, respectively, both of which extend the length LW of the chamber 130 between the intake and exhaust fluid ports 122, 124. The bottom wall 125 of the exhaust chamber 130 extends in a downward slope (e.g., at an angle of about 5-15 degrees from a central horizontal plane) from the intake port 122 to the exhaust port 124 such that extracted water flows, under the force of gravity, out of the internal compartment 118 through the exhaust port.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A liquid-gas separator assembly for a fuel cell system (FCS), the FCS including a transfer conduit, a hydrogen inlet, and an exhaust manifold, the separator assembly comprising:

an outer housing defining therein a fluid-tight internal compartment;

a single fluid inlet port located at a first position and at a first end of the outer housing, the single fluid inlet port configured to fluidly connect the internal compartment of the outer housing to the transfer conduit and receive therefrom FCS exhaust containing hydrogen and water;

a liquid outlet port located at a second position, below the first position, and at a second end of the outer housing, opposite the first end, the liquid outlet port configured to fluidly connect the internal compartment to the exhaust manifold and transfer thereto extracted water separated from the FCS exhaust;

a gas outlet port located at a third position, above the first and second positions, and at the second end of the outer housing, the gas outlet port configured to fluidly connect the internal compartment to the hydrogen inlet and transfer thereto extracted hydrogen separated from the FCS exhaust;

a first fluid chamber located inside the internal compartment of the outer housing, fluidly connecting the single fluid inlet port to the liquid outlet port, and configured to evacuate the extracted water from the internal compartment;

a second fluid chamber located inside the internal compartment above the first fluid chamber, fluidly connecting the first fluid chamber to the gas outlet port, and configured to evacuate the extracted hydrogen from the internal compartment; and a chamber wall located inside the internal compartment and separating the first and second fluid chambers, the chamber wall defining therethrough a single connector port fluidly connecting the first and second fluid chambers.

2. The separator assembly of claim 1, wherein the chamber wall extends entirely across the internal compartment from the single fluid inlet port to the liquid outlet port.

3. The separator assembly of claim 2, wherein the chamber wall has a wall length extending from the single fluid inlet port to the liquid outlet port, and wherein the connector port includes an elongated slot with a slot length extending about 65% or less of the wall length.

4. The separator assembly of claim 1, wherein the single fluid inlet port includes a fluid constriction interposed between the internal compartment and the transfer conduit, the fluid constriction configured to cause turbulent flow of the FCS exhaust entering the first fluid chamber through the single fluid inlet port from the transfer conduit.

5. The separator assembly of claim 1, wherein the first fluid chamber includes opposing top and bottom walls both extending between the single fluid inlet port and the liquid outlet port, the bottom wall extending in a downward slope from the single fluid inlet port to the liquid outlet port such that the extracted water flows, under forces of gravity, to the liquid outlet port.

6. The separator assembly of claim 1, wherein a first height of the first fluid chamber varies along a length of the internal compartment between the single fluid inlet port and the liquid outlet port.

7. The separator assembly of claim 6, wherein a first width of the first fluid chamber varies along the length of the internal compartment between the single fluid inlet port and the liquid outlet port.

8. The separator assembly of claim 1, wherein a first total volume of the first fluid chamber is less than a second total volume of the second fluid chamber.

9. The separator assembly of claim 1, wherein the single fluid inlet port fluidly connects to the internal compartment along a first horizontal plane, the liquid outlet port fluidly connects to the internal compartment along a second horizontal plane below the first horizontal plane such that the extracted water flows, under forces of gravity, through the liquid outlet port, and the gas outlet port fluidly connects to the internal compartment along a third horizontal plane above the first horizontal plane such that the extracted hydrogen floats through the gas outlet port.

10. The separator assembly of claim 1, wherein the single fluid inlet port has a first diameter, the liquid outlet port has a second diameter equal to or greater than the first diameter, and the gas outlet port has a third diameter greater than the first and second diameters.

11. The separator assembly of claim 1, wherein the outer housing is integrally formed with the single fluid inlet port, the liquid outlet port, and the gas outlet port as a single-piece structure, and wherein the first and second fluid chambers are defined as adjoining segments of the internal compartment.

12. An electric-drive vehicle, comprising:

a vehicle body with a plurality of road wheels attached to the vehicle body;

an electric traction motor attached to the vehicle body and configured to drive one or more of the road wheels to thereby propel the electric-drive vehicle;

a fuel cell system (FCS) attached to the vehicle body and operable to power the electric traction motor, the FCS including a fuel cell stack, a transfer conduit receiving FCS exhaust containing hydrogen and water from the fuel cell stack, a hydrogen inlet feeding hydrogen into the fuel cell stack, and an exhaust manifold evacuating FCS exhaust from the FCS; and a liquid-gas separator assembly including:

a rigid outer housing mounted to the FCS and defining therein a fluid-tight internal compartment;

a single fluid inlet port located at a first position and at a first end of the outer housing, the single fluid inlet port fluidly connecting the internal compartment to the transfer conduit and receiving therefrom at least a portion of the FCS exhaust;

a liquid outlet port located at a second position, below the first position, and at a second end of the outer housing, opposite the first end, the liquid outlet port fluidly connecting the internal compartment to the exhaust manifold and transferring thereto extracted water separated from the FCS exhaust;

a gas outlet port located at a third position, above the first and second positions, and at the second end of the outer housing, the gas outlet port fluidly connecting the internal compartment to the hydrogen inlet and transferring thereto extracted hydrogen separated from the FCS exhaust;

an exhaust chamber located inside the internal compartment, fluidly connecting the single fluid inlet port to the liquid outlet port, and evacuating the extracted water from the internal compartment to the exhaust manifold;

a hydrogen chamber located inside the internal compartment above the exhaust chamber, fluidly connecting the exhaust chamber to the gas outlet port, and evacuating the extracted hydrogen from the internal compartment to the hydrogen inlet; and a chamber wall located inside the internal compartment and separating the exhaust and hydrogen chambers, the chamber wall defining therethrough a single connector port fluidly connecting the exhaust and hydrogen fluid chambers.

13. A method of manufacturing a liquid-gas separator assembly for a fuel cell system (FCS), the FCS including a transfer conduit, a hydrogen inlet, and an exhaust manifold, the method comprising:

receiving an outer housing defining therein a fluid-tight internal compartment;

fluidly connecting the internal compartment to the transfer conduit via a single fluid inlet port configured to receive FCS exhaust containing hydrogen and water from the transfer conduit, the single fluid inlet port located at a first position and at a first end of the outer housing;

fluidly connecting the internal compartment to the exhaust manifold via a liquid outlet port configured to transfer to the exhaust manifold extracted water separated from the FCS exhaust, the liquid outlet port located at a second position, below the first position, and at a second end of the outer housing, opposite the first end; and fluidly connecting the internal compartment to the hydrogen inlet via a gas outlet port configured to transfer to the hydrogen inlet extracted hydrogen separated from the FCS exhaust, the gas outlet port located at a third position, above the first and second positions, and at the second end of the outer housing, wherein a first fluid chamber located inside the internal compartment of the outer housing fluidly connects the first fluid port to the second fluid port and is configured to evacuate the extracted water from the internal compartment through the second fluid port, wherein a second fluid chamber located inside the internal compartment above the first fluid chamber fluidly connects the first fluid chamber to the third fluid port and is configured to evacuate the extracted hydrogen from the internal compartment through the third fluid port, and wherein a chamber wall located inside the internal compartment of the outer housing separates the first and second fluid chambers, the chamber wall defining therethrough a single connector port fluidly connecting the first and second fluid chambers.

14. The method of claim 13, wherein the chamber wall extends entirely across the internal compartment of the outer housing from the single fluid inlet port to the liquid outlet port.

15. The method of claim 13, wherein the single fluid inlet port includes a fluid constriction interposed between the internal compartment and the transfer conduit, the fluid constriction configured to cause turbulent flow of the FCS exhaust entering the first fluid chamber through the single fluid inlet port from the transfer conduit.

16. The method of claim 13, wherein the first fluid chamber includes opposing top and bottom walls both extending between the single fluid inlet port and the liquid outlet port, the bottom wall extending in a downward slope from the single fluid inlet port to the liquid outlet port such that the extracted water flows, under forces of gravity, to the liquid outlet port.

17. The method of claim 13, wherein a first height of the first fluid chamber varies along a length of the internal compartment between the single fluid inlet port and the liquid outlet port, and wherein a first width of the first fluid chamber varies along the length of the internal compartment between the single fluid inlet port and the liquid outlet port.

18. The method of claim 13, wherein the single fluid inlet port fluidly connects to the internal compartment along a first horizontal plane, the liquid outlet port fluidly connects to the internal compartment along a second horizontal plane below the first horizontal plane such that the extracted water flows, under forces of gravity, through the liquid outlet port, and the gas outlet port fluidly connects to the internal compartment along a third horizontal plane above the first horizontal plane such that the extracted hydrogen floats through the gas outlet port.

19. The method of claim 13, further comprising integrally forming the outer housing, the single fluid inlet port, the liquid outlet port, and the gas outlet port as a single-piece structure with the first and second fluid chambers defined as adjoining segments of the internal compartment.

20. The method of claim 19, wherein the single fluid inlet port is formed with a first diameter, the liquid outlet port is formed with a second diameter equal to or greater than the first diameter, and the gas outlet port is formed with a third diameter greater than the first and second diameters.

* * * * *